United States Patent [19]
Herwig et al.

[11] Patent Number: 5,370,000
[45] Date of Patent: Dec. 6, 1994

[54] MAGNETIC FLOWMETER WITH FAULT DETECTION

[75] Inventors: Jorg Herwig, Kassel; Dieter Keese, Wahlsburg; Karl H. Rackebrandt, Adelebsen; Hans W. Schwiderski, Norten-Hardenberg, all of Germany

[73] Assignee: Fischer & Porter Company, Warminster, Pa.

[21] Appl. No.: 906,507

[22] Filed: Jun. 30, 1992

[30] Foreign Application Priority Data

Jul. 4, 1991 [DE] Germany .................. 4122225

[51] Int. Cl.⁵ .................................................. G01F 1/00
[52] U.S. Cl. .................................................. 73/861.17
[58] Field of Search ............ 73/861.15, 861.16, 861.17

[56] References Cited

U.S. PATENT DOCUMENTS

| | | | |
|---|---|---|---|
| 4,617,871 | 9/1979 | Shauger et al. | 73/861.16 |
| 4,676,112 | 6/1987 | Uematsu et al. | 73/861.17 |
| 4,704,908 | 11/1987 | Blatter | 73/861.17 |
| 4,709,583 | 12/1987 | DePaepe al. | 73/861 |

FOREIGN PATENT DOCUMENTS 3808913 12/1989 Germany ............ G01F 1/60

*Primary Examiner*—Ricahard E. Chilcot, Jr.
*Assistant Examiner*—R. Biegel
*Attorney, Agent, or Firm*—Ratner & Prestia

[57] ABSTRACT

A circuit for detecting faults in a magmeter system in which an electrically conductive fluid flows which is maintained at a reference potential. The circuit includes at least two electrodes in contact with the fluid. The electrode signals are conducted to the corresponding inputs of a measuring circuit. An alarm circuit is connected ahead of the measuring circuit. A difference in the magnitude of the values ($+U_S$ and $-U_S$) of the electrode signals and/or non-symmetries in the noise content of the electrode signals and/or a disturbance in the high frequency signal ($U_G$) in a loop which contains the electrodes and a high frequency producing generator causes an alarm to be activated.

12 Claims, 4 Drawing Sheets

MAGNETIC FLOWMETER WITH FAULT DETECTION

BACKGROUND OF THE INVENTION

The present invention relates to a circuit to detect disturbances in a magnetic flowmeter flow measurement system.

This circuit is of this type which responds to disturbances in the system ahead of the measuring circuit and, in particular, to the isolation of at least one input to the measuring circuit. Such an isolation of the input of the measuring circuit can result if an insulating layer is deposited on the corresponding electrode by the metered fluid, or the connection to the corresponding electrode is broken, or if, in any other manner, the electrically conductive path between the reference potential and the fluid is disturbed.

SUMMARY OF THE INVENTION

Magnetic flowmeter fault detection apparatus, constructed in accordance with the present invention, includes a pipe through which fluid flows and means for generating a magnetic field which extends through the pipe. Also included in this apparatus are first and second electrodes for developing first and second signals, respectively, representative of fluid flowrate through the magnetic field. The apparatus further includes means for:

(1) detecting a condition representative of at least one of:
   (a) a difference in the magnitudes of said first and said second signals,
   (b) a difference in the noise components of said first and said second signals, and
   (c) a predetermined effect on a test signal supplied to one of said electrodes; and
(2) developing an indication when such a condition is detected.

The invention will be described through use of examples with references to the attached figures.

DETAILED DESCRIPTION OF THE INVENTION

Figure 1:
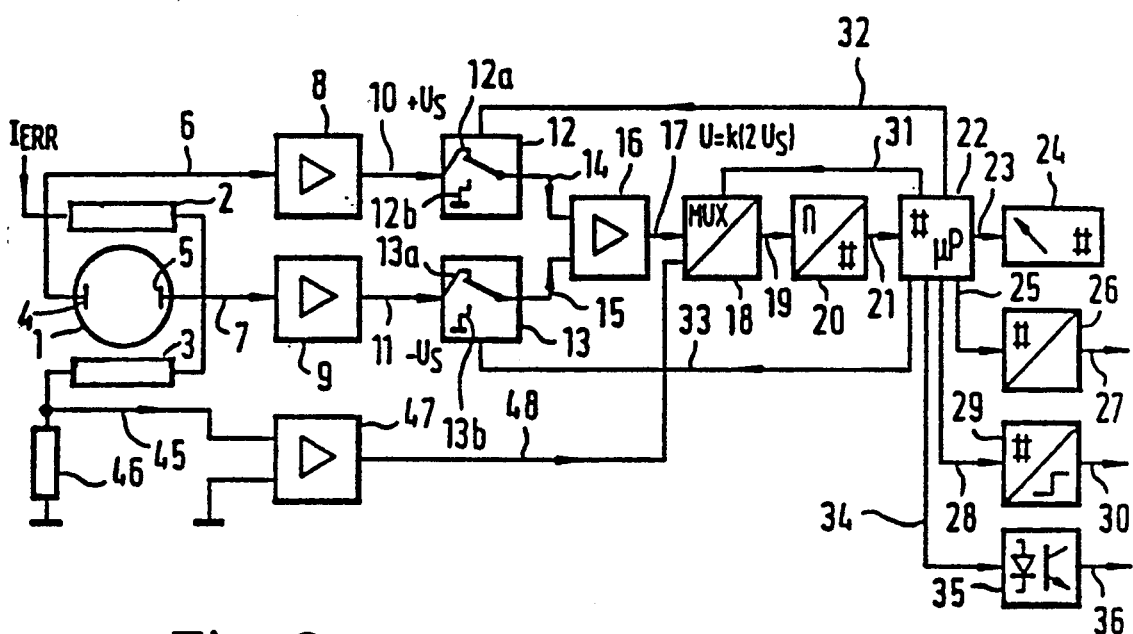
FIG. 1 shows a first embodiment of a circuit constructed in accordance with the present invention.

The same reference characters refer the same or similar elements.

Figure 2:
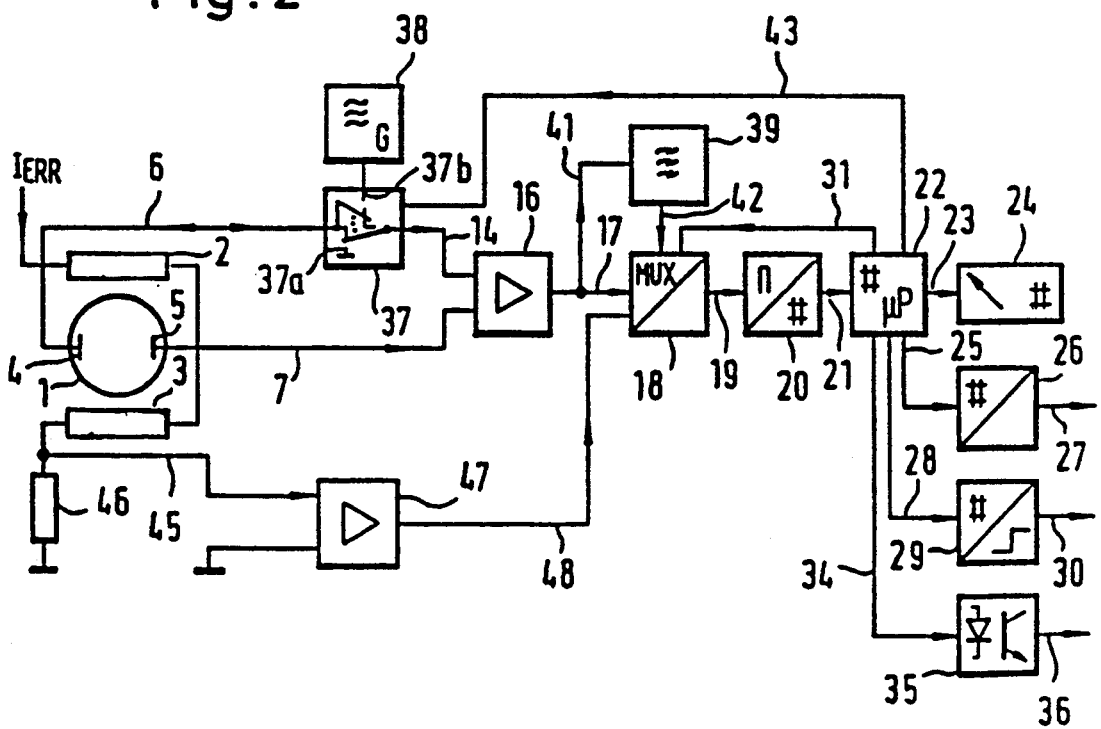
FIG. 2 shows a second embodiment of a circuit constructed in accordance with the present invention.

The flow measuring circuit designs shown in FIGS. 1 and 2 include a meter pipe 1. A magnetic field, generated by coils 2,3, extends perpendicularly through pipe 1. An excitation current $I_{EER}$ passes through the coils 2,3 which are connected in series, although they could also be connected in parallel. Electrodes 4,5 are installed on opposite sides of the meter pipe 1 perpendicular to the longitudinal axis of the magnetic field. A voltage, essentially proportional to the flowrate of the flowing fluid, is present on the electrodes 4,5.

In the circuit design shown in FIG. 1, the electrodes 4,5 are connected by leads 6,7 to the inputs of the impedance converters 8,9, which have a relatively high input impedance and a relatively low output impedance, and are located in close proximity to the electrodes 4,5. The outputs of the impedance converters 8,9 are connected by leads 10,11 to terminals 12a,13a, respectively, of bipolar switch 12/13. The other terminals 12b,13b of bipolar switch 12/13 are connected to the reference potential. The output of the switch 12/13 is connected by leads 14,15 to the two inputs of the signal amplifier 16. The output of the signal amplifier 16 is connected by lead 17 to the multiplexer 18. The output of the multiplexer 18 is connected to an input of the A/D converter 20. The output of the A/D converter 20 is connected by lead 21 to an input of the microprocessor 22. The microprocessor 22 controls, through lead 31, the multiplexer 18 and, through leads 32 and 33, the switches 12 and 13 of bipolar switch 12/13.

Other outputs of the microprocessor 22 are connected by lead 23 to a alpha-numeric LCD-display 24, by lead 25 to a current output circuit 26 for connection by lead 27 to an optional totalizer, by lead 28 to a binary pulse output circuit 29 for connection by lead 30 to an optional binary pulse device, and by lead 34 to optocoupler pulse out circuit 35 for connection by lead 36 to an optional optocoupler device.

The switches 12 and 13 are controlled through leads 32 and 33, which either set both switches in the mode shown in FIG. 1 or set the one switch 12 or the other switch 13 through the terminals 12b or 13b to the reference potential or set both switches 12 and 13 through terminals 12b and 13b to the reference potential.

In normal operation, the signal voltages from the electrodes 4 and 5 are the same but with opposite polarity. For example, the signal voltage at the output of the impedance converter 8 has an amplitude $+U_S$ and the signal voltage at the output of the impedance converter 9 has an amplitude $-U_S$. An amplified signal $U = k (2 U_S)$, where k is a proportionality factor, exists on the output of the signal amplifier 16. This amplified signal is only used during the measurement time intervals TM (see FIG. 3). During the diagnostic time interval T2, the switch 13 is connected to the reference potential by terminal 13b. During the diagnostic time interval T3, the switch 12 is connected to the reference potential by terminal 12b. During the diagnostic time interval T4, both switches 12 and 13 are connected to the reference potential by terminals 12b and 13b. The total time duration of the diagnostic time intervals T2, T3, and T4 is TD.

When the operation is normal, the output signal from the signal amplifier 16, during the diagnostic time intervals T2 and T3 is one-half the amplitude of the signal U, i.e. $\frac{1}{2}$ U. These signals are converted into digital signals in the A/D converter 20 and evaluated by the microprocessor 22 and designated as "error free".

If electrode 4 or 5 is covered with insulating layer, no bias current will flow into the input of the corresponding impedance converter 8 or 9. This leads to a saturation of the output of the impedance converter 8 or 9 and thereby to saturation of the output signal of the signal amplifier 16 which is noted by the microprocessor 22 and designated as "error".

Since the switches 12 and 13 are alternately connected to terminals 12a and 13a, 12a and 13b, and 12b and 13a, the microprocessor can recognize if electrode 4 or electrode 5 or both electrodes 4 and 5 are coated with an insulating layer or if some other disturbance has occurred in the connections between the inputs of the switches 12 and 13 and the reference potential.

Figure 5:
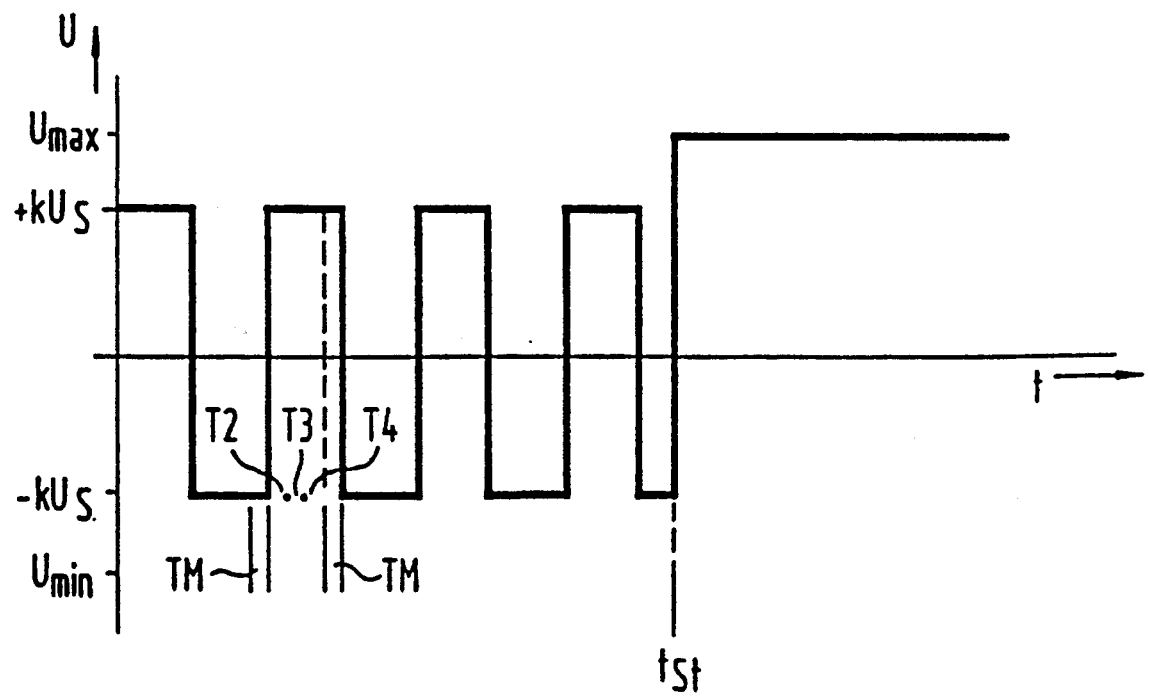
FIG. 5 shows a curve useful to explain the operation for saturation.

FIG. 5 shows schematically the variation of the output signal of the signal amplifier 16 during normal operation between $+kU_S$ and $-kU_S$ and the appearance of a disturbance signal in the diagnostic time interval T3 at the time $t_{St}$. The signal jumps (e.g. to $U_{max}$). The polarity of the signal at time $t_{St}$ can not be determined, thus the signal jumps either to $U_{max}$ or $U_{min}$.

The microprocessor 22 will also recognize a large disturbance signal on top of the signal from the signal amplifier 16.

If the coating builds over a period of time on either electrode 4 or 5, the noise content in the electrode signal from the electrode will also eventually increase. The microprocessor 22 will also recognize this fact. For the same reason, the microprocessor 22 can also recognize differences in the noise content of the electrode signal due to a different build up on each of the electrodes 4 and 5, especially before a complete electrode signal loss occurs.

Generally, the fluid is connected to the reference potential through grounding rings installed at the ends of the insulated pipe 1. The microprocessor 22 will recognize if the grounding rings are coated with an insulating layer.

The microprocessor 22 will also recognize if one the leads 6 or 7 is broken or if both leads 6 and 7 are broken, and also if an electrically conductive path exists between at least one of the electrodes 4 and 5 and the reference potential or whether an electrically conductive path exists between at least one of the leads 6 and 7 and the reference potential.

The operation of the circuit according to FIG. 1 remains essentially the same if the impedance converters 8 and 9 are eliminated. In practice, however this can lead to difficulties such as microphonics since both ends of the leads 6,10,14, or 7,11,15 are connected to high impedances.

The inputs to the impedance converters 8 and 9 can contain bias resistors. This, however, leads to the result that saturation will not occur if electrodes 4 or 5 become insulated, or if the grounding rings become insulated, or if leads 6 or 7 break. The circuit, however, will still recognize non-symmetrical electrode impedances, since as noted earlier, these lead to increased noise content on the signals of electrodes 4 and 5. The circuit will also recognize a break in the leads 6 and 7 and a connection to the reference potential of leads 6 or 7 as well as a conductive path between the electrodes 4 and 5 and the reference potential.

Figure 3:
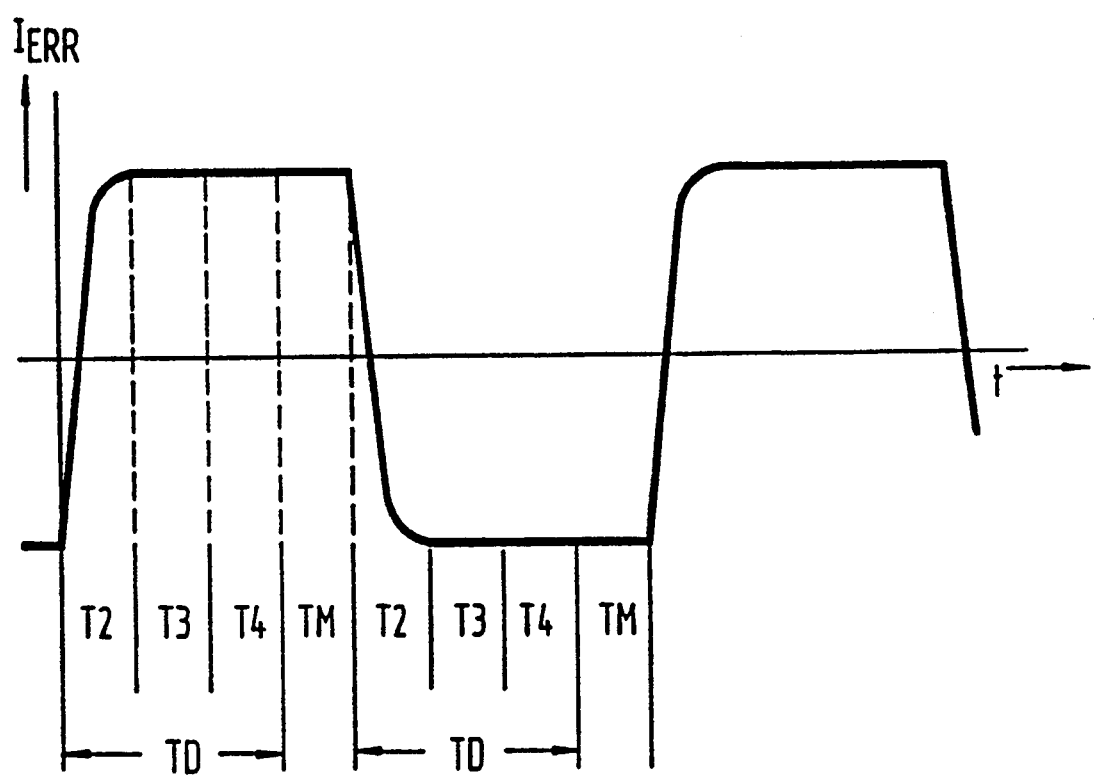
FIG. 3 shows a curve with the diagnostic time intervals and the measurement time intervals when a bipolar magnetic field exists.
Figure 4:
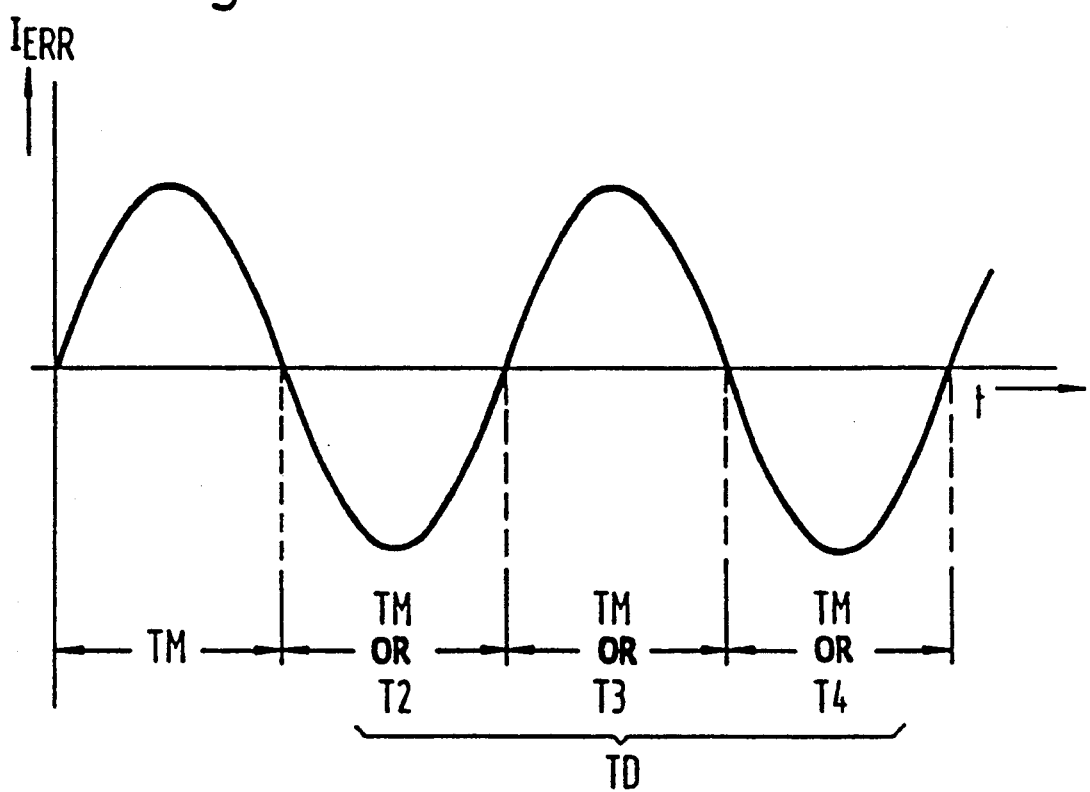
FIG. 4 shows a curve with the diagnostic time intervals and the measurement time intervals when a bipolar sinusoidal magnetic field exists.

In the described design, the measurement signal is only measured during the time interval TM (see FIG. 3). As shown in FIG. 4, the signal can be continuously measured when a bipolar sinusoidal magnetic field is used. The measurement time intervals TM are stretched to include the entire half period. If a diagnosis is desired, the diagnostic time intervals T2, T3 and T4 can replace the corresponding measurement time interval TM and a diagnosis, as described above, can be carried out. Naturally, the measurement signal is lost during the total diagnostic time interval TD.

The circuit can, especially in connection with the arrangements illustrated in FIGS. 1 and 2, be provided with a resistor 46 connected in series with the coils 2 and 3, across which a voltage proportional to the excitation current $I_{ERR}$ can be derived and connected by lead 45 to amplifier 47 and the amplified signal fed to an input of the multiplexer 18 over lead 48. Through a simultaneous measurement of the output signal of the signal amplifier 16 and the reference voltage on lead 48, an evaluation of the signal from the signal amplifier 16 can be made during the diagnostic time interval TD.

The circuit design shown in FIG. 2 contains a switch 37 which selectively can connect lead 6 with lead 14 or the lead 14 over terminal 37a to the reference potential and the lead 6 over terminal 37b to a high frequency generator 38. The high frequency generator 38 feeds electrode 4 in the latter case. The output signal of amplifier 16 is connected by lead 41 to an input of a high pass filter 39, whose output is connected by lead 42 to the multiplexer 18. If the high frequency generator 38 is connected to electrode 4, it is possible for the microprocessor 22 to determine if the signal from the high frequency generator 38 is disturbed or not disturbed and thereby make a disturbance analysis. Through such a disturbance analysis, it can be determined if at least one of the electrodes 4 and 5 is covered with an insulating layer, or if a conductive path exists between at least one of the electrodes 4 and 5 and the reference potential, or if at least one of the leads 6 and 7 is broken, or if at least one of the leads 6 and 7 is conductively connected to the reference potential.

Figure 6:
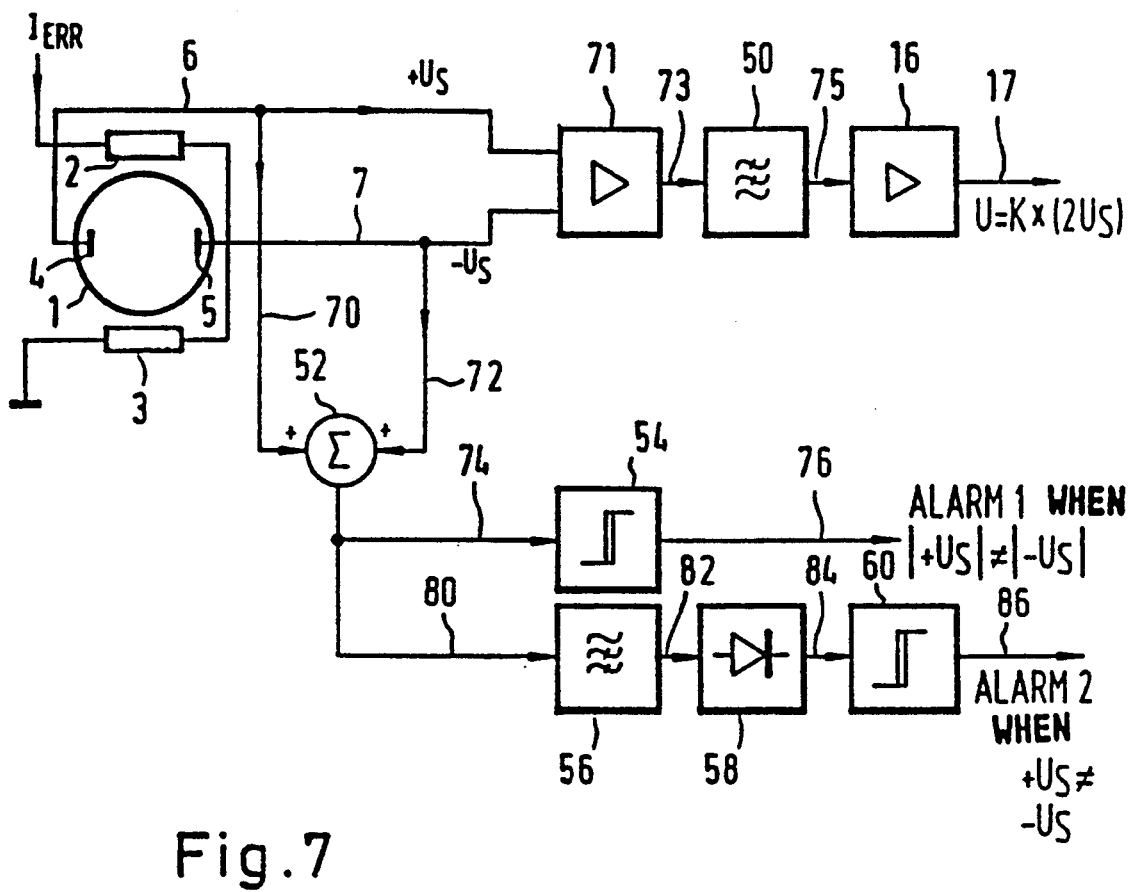
FIG. 6 shows a third embodiment of a circuit constructed in accordance with the present invention.

The design shown in FIG. 6 contains a summing circuit 52 whose inputs are connected by leads 70 and 72 to the electrodes 4 and 5 and whose output is connected by lead 74 to a threshold switch 54 whose output is connected by lead 76 to an alarm transmitter Alarm 1. Additionally, the electrodes 4 and 5 are connected to the inputs of an input amplifier 71 which is connected by lead 73 to a low pass filter 50. The output of the low pass filter 50 is connected by lead 75 through an amplifier 16 to lead 17 which acts as a measuring circuit. The output voltage on lead 17 is normally $U=k (2 U_S)$.

When $+U_S$ is not the same as $-U_S$, a disturbance condition exists, and the output voltage of the summing circuit 52 is other than zero. The threshold switch 54 then produces an alarm signal Alarm 1 at the alarm transmitter over lead 76.

In the preceding example, the output of the summing circuit 52 is also connected by lead 80 to a high pass filter 56 whose output is connected by lead 82 to demodulator 58. The output of the demodulator 58 is connected by lead 84 to a threshold switch 60 whose output is connected by lead 86 to a second alarm transmitter Alarm 2.

If a disturbance is present, the noise content is different in the signals $+U_S$ and $-U_S$. This results in a high frequency signal in lead 80 and thereby to an activation of the alarm transmitter Alarm 2.

Basically it is possible to utilize only one of the alarm transmitters, Alarm 1 or Alarm 2.

Generally, the summing circuit 52 will produce an output signal if non-symmetries exist in the circuit ahead of the summing circuit 52. Such non-symmetries for example can result from:

an insulating layer on the surface of at least one of the electrodes 4 and 5 a short circuit to ground of at least one of the electrodes 4 and 5 a rupture of at least one of the leads 6,7,70,72 a short circuit to ground of at least one of the leads 6,7,70,72 unequal impedances at the electrodes 4 and 5 from the growth of an insulating layer on the surface of at least one of the electrodes 4 and 5

Figure 7:
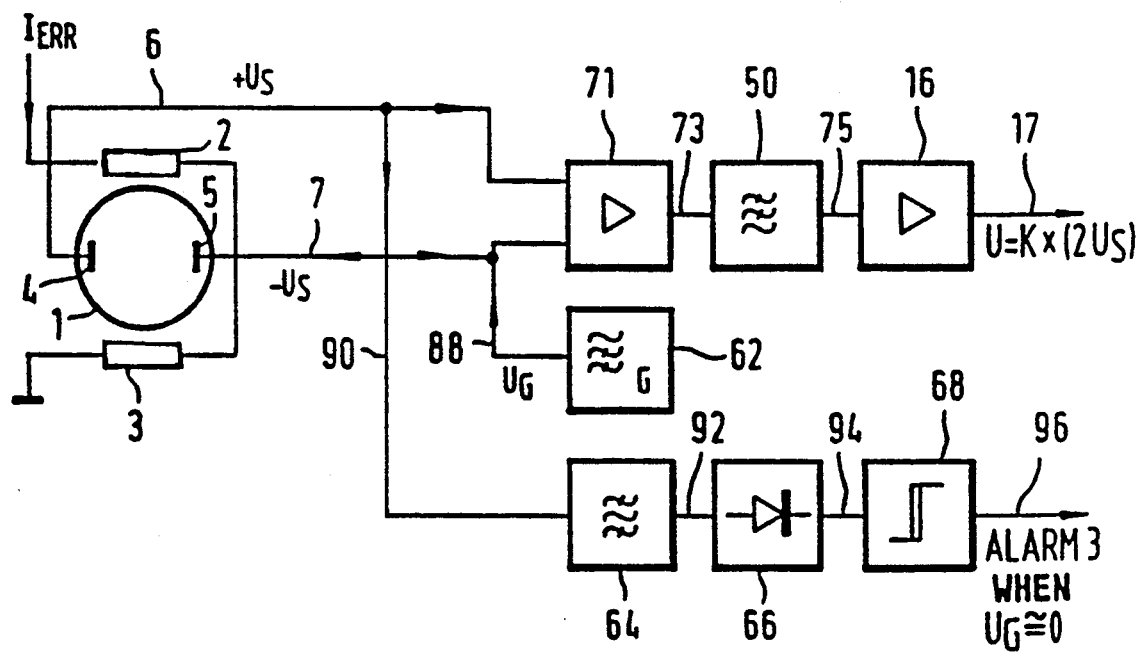
FIG. 7 shows a fourth embodiment of a circuit constructed in accordance with the present invention.

The design shown in FIG. 7 is different from the design shown in FIG. 6 in that a high frequency signal $U_G$ is produced by a high frequency generator 62 which is connected by lead 90 to a matched high pass filter 64 and applied to lead 7 through lead 88. The output of the band pass filter 64 is connected by lead 92 to a demodulator 66 which is connected by lead 94 to a threshold switch 68. The output of the threshold switch 68 is connected by lead 96 to an alarm transmitter Alarm 3.

If the high frequency signal $U_G$ is fed to lead 7, then a disturbance causes a zero or almost zero output signal from the band pass filter 64 and the alarm transmitter Alarm 3 responds.

A disturbance can occur for example due to:

an insulating layer on the surface of at least one of the electrodes 4 and 5 a break in at least one of the leads 6,7,88,90 a short circuit to ground in at least one of the leads 6,7,88,90 a short circuit to ground of at least one of the electrodes 4 and 5

The circuit shown in FIG. 7 can also be combined with the circuit shown in FIG. 6 with one or both alarm transmitters.

The output leads 76,86,96 which are connected to the alarm transmitters Alarm 1, Alarm 2, and Alarm 3 can, as in the first and second designs, be connected to a microprocessor. The microprocessor can evaluate the various signals and provide to a display and/or to a binary output an appropriate error message.

The described designs are essentially independent from the normal evaluation of the signals $+U_S$, $-U_S$ and from the time function of the excitation current.

What is claimed:

1. A magnetic flowmeter with fault detection comprising:
   a pipe through which fluid flows;
   means for generating a magnetic field which extends through said pipe;
   first and second electrodes positioned on opposite sides of said pipe on an axis which extends substantially horizontally through said pipe for developing first and second signals, respectively, representative of fluid flowrate through said magnetic field;
   a differential amplifier having:
   (a) a first input to which said first signal is supplied,
   (b) a second input to which said second signal is supplied, and
   (c) an output at which first, second and third output signals are developed;
   switching means between said first and said second electrodes and said differential amplifier for selectively supplying:
   (a) said first signal to said first input of said differential amplifier, and
   (b) said second signal to said second input of said differential amplifier;
   timing means for controlling said switching means to supply:
   (a) only said first signal to said first input of said differential amplifier during a first time interval to develop said first output signal of said differential amplifier,
   (b) only said second signal to said second input of said differential amplifier during a second time interval to develop said second output signal of said differential amplifier, and
   (c) both said first and said second signals to said first and said second inputs, respectively, of said differential amplifier during a third time interval to develop said third output signal of said differential amplifier;
   and error detection means, responsive to said first, said second, and said third output signals of said differential amplifier, for supplying an error signal when at least one of:
   (a) said first output signal of said differential amplifier exceeds said third output signal of said differential amplifier by a predetermined amount, and
   (b) said second output signal of said differential amplifier exceeds said third output signal of said differential amplifier by a predetermined amount.

2. A magnetic flowmeter with fault detection according to claim 1 wherein said timing means also control said switching means to supply neither of said first and said second signals to said inputs of said differential amplifier during a fourth time interval.

3. A magnetic flowmeter with fault detection according to claim 2 further including:
   (a) a first impedance converter having a relatively high input impedance and a relatively low output impedance connected between said first electrode and said first input of said differential amplifier in series with said switching means, and
   (b) a second impedance converter having a relatively high input impedance and a relatively low output impedance connected between said second electrode and said second input of said differential amplifier in series with said switching means.

4. A magnetic flowmeter with fault detection according to claim 3 wherein said timing means control said switching means to substitute:
   (a) a reference potential for said first signal during said second time interval,
   (b) said reference potential for said second signal during said first time intervals, and
   (c) said reference potential for both said first and said second signals during said fourth time interval.

5. A magnetic flowmeter with fault detection comprising:
   a pipe through which fluid flows;
   means for generating a magnetic field which extends through said pipe;
   first and second electrodes positioned on opposite sides of said pipe on an axis which extends substantially horizontally through said pipe for developing first and second signals, respectively, representative of fluid flowrate through said magnetic field;
   a source of a high frequency signal;
   a differential amplifier having:
   (a) a first input to which said first signal is supplied,
   (b) a second input to which said second signal and said high frequency signal are supplied, and
   (c) an output at which first and second output signals are developed;

switching means between said source of a high frequency signal, said first electrode and said first input of said differential amplifier for selectively supplying:
  (a) said first signal to said first input of said differential amplifier,
  (b) a reference potential to said first input of said differential amplifier, and
  (c) said high frequency signal to said first electrode;
timing means for controlling said switching means to supply:
  (a) said high frequency signal to said first electrode and said reference potential to said first input of said differential amplifier during a first time interval to develop said first output signal of said differential amplifier,
  (b) said first signal to said first input of said differential amplifier during a second time interval to develop said second output signal of said differential amplifier,
and error detection means, responsive to said first and said second output signals of said differential amplifier, for supplying an error signal when said first output signal of said differential amplifier due to the presence of said high frequency signal at said second input of said differential amplifier during said first time interval differs from a predetermined signal by a predetermined amount.

6. A magnetic flowmeter with fault detection according to claim 5 wherein:
  (a) said means for generating said magnetic field include first and second coils positioned above said pipe and below said pipe, respectively, and through which an exciting current flows, and
  (b) said flowmeter further includes means responsive to the exciting current for developing a reference signal which controls said error detection circuit.

7. A magnetic flowmeter with fault detection according to claim 6 wherein said error detection means include said timing means.

8. A magnetic flowmeter with fault detection comprising:
  a pipe through which fluid flows;
  means for generating a magnetic field which extends through said pipe;
  first and second electrodes positioned on opposite sides of said pipe on an axis which extends substantially horizontally through said pipe for developing first and second signals, respectively, representative of fluid flowrate through said magnetic field;
  a differential amplifier having:
    (a) a first input to which said first signal is supplied,
    (b) a second input to which said second signal is supplied, and
    (c) an output at which an output signal is developed;
  a summing circuit having:
    (a) a first input to which said first signal is supplied,
    (b) a second input to which said second signal is supplied, and
    (c) an output at which an output signal is developed;
  a first threshold indicator responsive to said output signal developed at said output of said summing circuit for supplying an error signal when said output signal developed at said output of said summing circuit represents a difference between said first and said second signals which exceeds a predetermined amount;
  and a high pass filter and a second threshold indicator responsive to said output signal developed at said output of said summing circuit for supplying an error signal when a noise component of said output signal developed at said output of said summing circuit represents a difference in the noise components of said first and said second signals which exceeds a predetermined difference.

9. A magnetic flowmeter with fault detection comprising:
  a pipe through which fluid flows;
  means for generating a magnetic field which extends through said pipe;
  first and second electrodes positioned on opposite sides of said pipe on an axis which extends substantially horizontally through said pipe for developing first and second signals, respectively, representative of fluid flowrate through said magnetic field;
  a source of a high frequency signal connected to said first electrode;
  a differential amplifier having:
    (a) a first input to which said first signal is supplied,
    (b) a second input to which said second signal and said high frequency signal are supplied, and
    (c) an output at which an output signal is developed;
  a high pass filter connected to said second electrode for passing said high frequency signal supplied to said second input of said differential amplifier;
  and a threshold indicator connected to said high pass filter and responsive to said high frequency signal passed by said high pass filter for developing an error signal when said high frequency signal passed by said high pass filter deviates from a predetermined signal by a predetermined amount.

10. Magnetic flowmeter fault detection comprising:
  a pipe through which fluid flows;
  means for generating a magnetic field which extends through said pipe;
  first and second electrodes for developing first and second signals, respectively, representative of fluid flowrate through said magnetic field;
  means, including:
    (a) switching means for selectively substituting at prescribed times a reference potential for said first signal and for said second signal, and
    (b) means including an amplifier:
      (1) having first and second inputs to which said first and said second signals, respectively, are supplied,
      (2) adapted to be driven to saturation when said reference potential is substituted by said switching means for said first and said second signals and connected to said first and said second inputs of said amplifier, and
      (3) responsive to said reference potential and said first signal and said reference potential and said second signal,
  for:
    (a) detecting a condition representative of at least one of:
      (1) a difference in the magnitudes of said first and said second signals in response to said reference potential and said first signal and said reference potential and said second signal, (2) a difference in the noise components of said first and said second signals in response to said reference potential and said first signal and said reference potential and said second signal, and (3) a predetermined effect on a high frequency signal supplied to one of said electrodes, and (b) developing an indication when such a condition is detected;

and means responsive to said first and said second signals for indicating fluid flowrate through said magnetic field.

11. Magnetic flowmeter fault detection apparatus according to claim 10 further including first and second impedance converters, each having a high input impedance and a low output impedance, through which said first and said second signals, respectively, are conducted to said switching means.

12. Magnetic flowmeter fault detection apparatus according to claim 10 wherein said difference determining means further include:

(a) means for developing a signal representative of the magnitude of said magnetic field, and (b) means for comparing said signal representative of the magnitude of said magnetic field and the output from said amplifier.

* * * * *

UNITED STATES PATENT AND TRADEMARK OFFICE
CERTIFICATE OF CORRECTION

PATENT NO. : 5,370,000
DATED      : December 6, 1994
INVENTOR(S) : Herwig, et. al.

It is certified that error appears in the above-indentified patent and that said Letters Patent is hereby corrected as shown below:

Title page, item [56], References Cited, the number of the first reference listed under U.S. Patent Documents should be changed from "4,617,871" to --4,167,871--.

Signed and Sealed this

Twenty-eight Day of March, 1995

Attest:

BRUCE LEHMAN

*Attesting Officer*    *Commissioner of Patents and Trademarks*